(No Model.)

J. HOEY.
HANGER FOR PIPES.

No. 330,703. Patented Nov. 17, 1885.

WITNESSES:
Otto Aufeland
William Miller

INVENTOR
James Hoey.
BY Van Santvoord & Hauff
ATTORNEYS

UNITED STATES PATENT OFFICE.

JAMES HOEY, OF BROOKLYN, NEW YORK.

HANGER FOR PIPES.

SPECIFICATION forming part of Letters Patent No. 330,703, dated November 17, 1885.

Application filed May 21, 1885. Serial No. 166,265. (No model.)

*To all whom it may concern:*

Be it known that I, JAMES HOEY, a citizen of the United States, residing at Brooklyn, in the county of Kings and State of New York, have invented new and useful Improvements in Hangers for Pipes, of which the following is a specification.

This invention has for its object to provide novel means for hanging pipes; and to such end it consists in the novel construction and combination of devices hereinafter described and claimed, reference being made to the accompanying drawings, illustrating the invention, in which—

Figure 1:
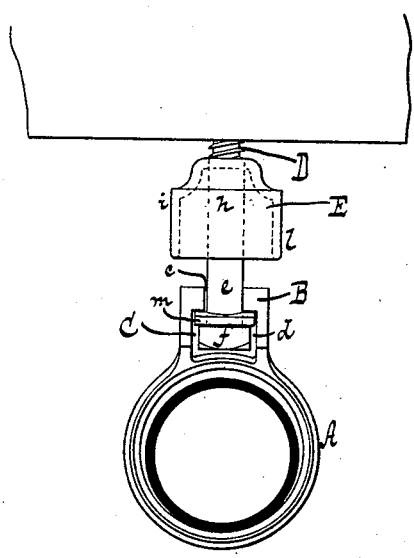
Figure 2:
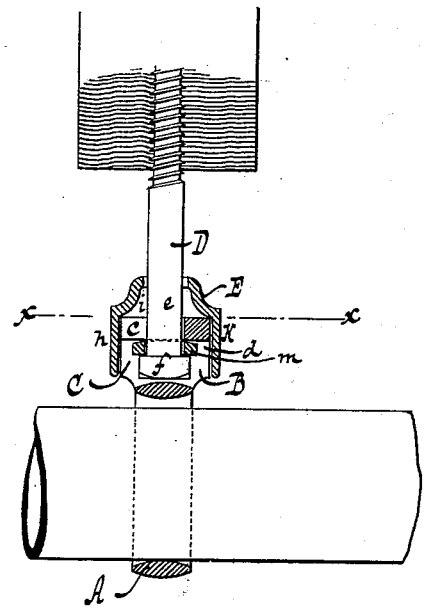
Figure 4:
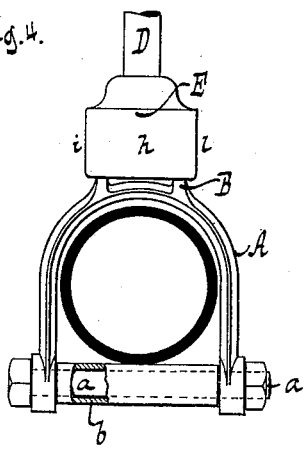
Figure 3:
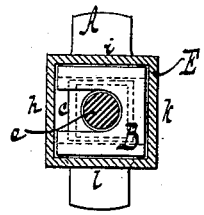
Figure 5:
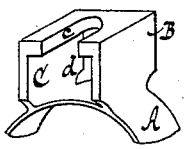

Figure 1 represents a face view of my hanger. Fig. 2 is a transverse vertical section of the same. Fig. 3 is a horizontal section in the plane $x\ x$, Fig. 2. Fig. 4 is a face view of my hanger in a modified form. Fig. 5 is a perspective view of the open socket in the shank of the eye.

Similar letters indicate corresponding parts.

In the drawings, the letter A designates an eye, which is made of iron, brass, or other suitable material, just large enough to admit the pipe to be supported. The eye shown in Figs. 1, 2, and 3 is to be used when the ends of the pipe to be supported are still free, so that the eye can be slid on; but if the eye cannot be slid over the ends of the pipe—that is to say, if the hanger is to be applied to a pipe already in position—I make it in the form of a fork having a bolt, $a$, passing through holes in the ends of its prongs, (see Fig. 4,) and in order to permit the pipe as the same expands and contracts to move freely through the eye, a tubular roller, $b$, is mounted upon the bolt $a$. This roller revolves freely upon the bolt, and it also serves as a stop, which prevents the prongs of the fork from being drawn together, so as to clamp the pipe if the nut of the bolt is screwed up.

The eye A is provided with a shank, B, and in this shank is formed an open socket, C, which is provided with a slot, $c$, and a cavity, $d$, the former to admit the stem $e$, and the latter to admit the head $f$ of the bolt D, from which my hanger is suspended. A perspective view of this open socket is shown in Fig. 5. After the socket C has been placed upon the bolt, as shown in Figs. 1, 2, and 3, the lock E is applied, so as to retain the hanger in the required position. This lock is made in the form of a cap provided with an opening, $g$, in its top, so that it can be placed upon the supporting-bolt D before the latter is secured in the required position. When this lock is dropped down to the position shown in Figs. 2 and 4, the hanger is retained by the bolt D, and it cannot be removed therefrom except by raising the lock E up high enough to clear the open socket C.

In the example shown in the drawings the lock E is made with four sides, $h\ i\ k\ l$, Fig. 3; but the sides $i\ l$ can be dispensed with, since the sides $h\ k$ retain the hanger in position upon the bolt. A washer, $m$, with a convex surface is placed upon the head $f$ of the bolt D to permit the hanger to rock and to follow the pipe as the same contracts or expands.

What I claim as new, and desire to secure by Letters Patent, is—

The combination of the eye A, having an angular shank, B, provided with an open socket, C, having a slot, $c$, the bolt D, having a head, and fitting said socket and slot, and a lock, E, sliding on the bolt, and composed of a cap having the opening $g$, and the opposite sides, $h$ and $k$, engaging the shank and closing the open side of the socket therein, substantially as described.

In testimony whereof I have hereunto set my hand and seal in the presence of two subscribing witnesses.

JAMES HOEY. [L. S.]

Witnesses:
W. HAUFF,
E. F. KASTENHUBER.